United States Patent
Corlett et al.

[11] Patent Number: 6,096,185
[45] Date of Patent: *Aug. 1, 2000

[54] METHOD AND APPARATUS FOR RECOVERY OF WATER AND SLURRY ABRASIVES USED FOR CHEMICAL AND MECHANICAL PLANARIZATION

[75] Inventors: Gary L. Corlett, Hollister; Glenn A. Roberson, Jr., Carmel, both of Calif.

[73] Assignee: Lucid Treatment Systems, Inc., Hollister, Calif.

[ * ] Notice: This patent is subject to a terminal disclaimer.

[21] Appl. No.: 09/315,638

[22] Filed: May 20, 1999

Related U.S. Application Data

[63] Continuation of application No. 08/870,082, Jun. 5, 1997, Pat. No. 5,928,492.

[51] Int. Cl.[7] .................................................. C02F 1/46
[52] U.S. Cl. ........................ 205/742; 204/515; 204/571; 210/175; 210/737; 210/774; 210/775
[58] Field of Search ............................ 205/742; 204/571, 204/515; 210/175, 737, 774, 775

[56] References Cited

U.S. PATENT DOCUMENTS

| | | |
|---|---|---|
| 717,385 | 12/1902 | Gathmann . |
| 943,083 | 12/1909 | Kuchs . |
| 1,044,570 | 11/1912 | Raasloff et al. . |
| 2,502,704 | 4/1950 | Chisholm . |
| 2,510,781 | 6/1950 | Howard . |
| 3,963,175 | 6/1976 | Daubman et al. . |
| 3,973,984 | 8/1976 | Hentschel . |
| 4,361,480 | 11/1982 | Corbus et al. . |
| 4,427,407 | 1/1984 | Paschedag . |
| 4,944,097 | 7/1990 | Brouwers . |
| 4,944,883 | 7/1990 | Schoendorfer et al. . |
| 5,148,945 | 9/1992 | Geatz . |
| 5,222,933 | 6/1993 | Knelson et al. . |
| 5,330,072 | 7/1994 | Ferri, Jr. et al. . |
| 5,338,284 | 8/1994 | Knelson . |
| 5,370,269 | 12/1994 | Bernosky et al. . |
| 5,372,571 | 12/1994 | Knelson et al. . |
| 5,591,340 | 1/1997 | Meikrantz et al. . |
| 5,928,492 | 7/1999 | Corlett et al. ........................... 205/742 |

*Primary Examiner*—Arun S. Phasge
*Attorney, Agent, or Firm*—Fulwider Patton Lee & Utecht, LLP

[57] ABSTRACT

Abrasive components and water are recovered from an aqueous chemical mechanical slurry used for planarization of semiconductor materials. The slurry effluent is preferably brought to a neutral pH, and cooled to a temperature between about 0° C. and about 15° C. An electrical potential can be applied to the slurry effluent to facilitate agglomeration and separation of particles of abrasive material in the slurry effluent. In one embodiment, the slurry effluent is introduced into a process chamber at ambient temperature and pressure, and supernatant liquid separated from the process chamber is then subjected to a reduction of pressure in a vacuum chamber to cause gas entrapped in the supernatant liquid to bubble to the surface of the supernatant liquid for further separation and collection of water and abrasive particles from the slurry effluent. In another embodiment, slurry effluent is filtered through one or more self-cleaning reversible gross particle filter assemblies.

17 Claims, 8 Drawing Sheets

METHOD AND APPARATUS FOR RECOVERY OF WATER AND SLURRY ABRASIVES USED FOR CHEMICAL AND MECHANICAL PLANARIZATION

RELATED APPLICATIONS

This application is a continuation of Ser. No. 08/870,082 filed Jun. 5, 1997 now U.S. Pat. No. 5,928,492.

BACKGROUND OF THE INVENTION

1. Field of the Invention

This invention relates generally to mechanical and chemical processing of semiconductor wafers, and more particularly concerns a method and apparatus for recovery of components of an aqueous chemical and mechanical abrasive slurry containing finely divided, suspended particles following their use in processing of semiconductor wafers.

2. Description of Related Art

Semiconductor components are commonly manufactured by layering electrically conductive and dielectric materials to achieve appropriate electrical characteristics for fabrication of multiple electrical components such as resistors, capacitors and transistors. Many of these discrete devices are incorporated into integrated circuits for use in creating microprocessors, memory chips, logic circuits, and the like. Many integrated circuits can be produced on semiconductor wafers by layering of dielectric and electrically conductive materials to create multiple semiconductor devices in a relatively small area.

The density of electrical components on such semiconductor devices has continually increased as trace line widths and element sizes on such semiconductor devices have narrowed. At one time, for example, trace line widths on such devices typically ranged from 1 $\mu$m to 4 $\mu$m. However, in recent years, the industry has made significant advances in reducing trace line widths used in integrated circuits to less than 1 $\mu$m. Currently, trace line widths of 0.5 to 0.35 $\mu$m are common, and research is being conducted to achieve trace line widths of from 0.25 $\mu$m to 0.18 $\mu$m. In addition, the demand for increased memory and computing power has driven limits on the number of semiconductor devices per integrated circuit that are achievable ever higher, resulting in an increase in the number of layers applied to semiconductor wafers, while the typical size of the integrated circuits continues to decrease. The combination of narrower trace line widths, increased numbers of layers of materials and higher densities of semiconductor devices per integrated circuit has made such devices increasingly susceptible to failure due to inconsistencies on semiconductor wafer surfaces, and it has become increasingly important that such semiconductor wafers have surfaces and dielectric layers that are uniformly smooth.

Methods for chemical mechanical planarization (CMP) have been developed to polish the surface of semiconductor wafers, and typically involve rotating the wafer on a polishing pad, applying pressure through a rotating chuck, and supplying an aqueous chemical slurry containing an abrasive polishing agent to the polishing pad for both surfactant and abrasive action. The chemical slurry can additionally contain chemicals that etch various surfaces of the wafer during processing. Abrasive agents that can be used in the chemical mechanical slurry include particles of fumed silica, cesium and alumina. The chemical mechanical slurry can also include stabilizer or oxidizer agents. Fumed silica is typically mixed with a stabilizer such as potassium hydroxide or ammonium hydroxide, and is commonly used to polish dielectric or oxide layers on the semiconductor wafer. Cesium and alumina are commonly mixed with an oxidizer agent such as ferric nitrate or hydrogen peroxide, and are typically used to polish metal layers, such as tungsten, copper and aluminum, for example.

The slurry and material removed from the various layers of the semiconductor wafer form a waste stream that is commonly disposed of as industrial waste. The abrasive components constitute approximately 8% to 15% of the raw waste stream, with the remainder constituting other chemical agents such as stabilizer or oxidizer agents, and water. The raw waste stream is typically diluted with rinse water to yield a final solids concentration of approximately 1% to 1.5% in the waste stream. However, the disposal of dissolved or suspended solids in the industrial waste stream has become a relevant issue due to strict local, state and federal regulations, and it would thus be desirable to provide a process and apparatus to remove abrasive components from the waste stream for possible reprocessing for use again in the chemical mechanical slurry or for other reuse or disposal, or for possible removal of heavy metal components for separate disposal. It would also be desirable to treat and reclaim the waste stream supernatant liquid to permit reuse of the supernatant liquid from the chemical mechanical planarization process.

While conventional techniques of reverse osmosis filtration, centrifugation and electrophoreses have been used for reclamation of water from fluids containing large particles typically greater than about 3–4 microns in diameter, such as coal slurry, mud, and effluent from metal plating processes, these techniques do not effectively deal with submicron colloidal suspensions produced in the industrial waste from the semiconductor manufacturing and fine grinding industries. Such techniques are also commonly limited to batch processing or have low throughput volumes, and are not readily adapted to high volume, continuous service. Filters are also typically inefficient and costly for removing fine suspended solids in such waste streams.

Other waste water treatment processes involve pH neutralization and addition of flocculating or settling agents, such as alkaline earth metal oxides, alkaline earth metal hydroxides and cationic polymers, for removal of suspended solids, and decanting of supernatant liquid from settling, tanks. However, the use of such flocculating agents can pose serious problems for the reuse of reclaimed solids and reclaimed water for the semiconductor manufacturing industry. Such systems also tend to be large and relatively ineffective in removing fine or colloidal particles, and are also not readily adapted to high volume, continuous service. Because of the large volume of waste generated by the semiconductor manufacturing process, it is desirable to provide the capability for processing the waste stream from the semiconductor manufacturing industry on a continuous, rather than batch, basis.

Conventional techniques for motivating slurries utilize pumps, which are generally suitable for most slurries which are intended to be colloidal in nature. Such slurries are commonly maintained in suspension with minor agitation. The use of pumps such as centrifugal pumps typically cause flocs to break apart, resulting in an increase in the level of finely suspended particles, thereby hindering removal of flocs from the slurries. Diaphragm and peristaltic pumps typically create smaller particles, and therefore further hinder the removal of solids from slurries. It would therefore also be desirable to provide a method and system for separation and recovery of relatively small particles from slurries that motivates the slurry for processing with a minor amount of agitation. The present invention meets all of these needs.

SUMMARY OF THE INVENTION

Briefly, and in general terms, the present invention provides an environmentally safer system for the separation and recovery of abrasive components and water from an aqueous chemical mechanical slurry used for planarization of semiconductor materials, to permit recycling and reuse of the abrasives in the planarization process, and reuse of the liquid effluent, such as for gray water for irrigation, process cooling water, as make-up water for a reverse osmosis system, or safe disposal in a waste stream, as desired.

The invention accordingly provides for a method and apparatus for recovering particles of abrasive material from an aqueous slurry of the particles of abrasive material. In the method and apparatus of the invention, an aqueous slurry of particles of abrasive material is introduced into one or more process chambers or separation columns, and cooled to a temperature between about 0° C. and about 15° C. to cause a portion of the aqueous slurry containing agglomerations of the particles to move to a solids collection area or settling chamber of the separation column, and to cause the remainder of the aqueous slurry to exit through a supernatant outlet as supernatant liquid to a supernatant liquid collection tank. In a currently preferred embodiment, a plurality of the separation columns are connected in sequence. In one presently preferred embodiment, an electrical potential is also applied between a first electrode and a second electrode in the separation column to affect the electrical properties of the particles of abrasive material to facilitate agglomeration and separation of the particles of abrasive material. The aqueous slurry is then directed through a nozzle to cause the aqueous slurry to flow in a helical flow pattern in the separation column. The portion of the aqueous slurry in the solids settling chamber containing agglomerations of the particles is then discharged to a collection tank. In one currently preferred embodiment, the portion of the aqueous slurry in the solids settling chamber containing agglomerations of the particles can be discharged periodically to a collection tank. Alternatively, the portion of the aqueous slurry in the solids settling chamber containing agglomerations of the particles can be discharged to a collection tank continuously.

Before the aqueous slurry of particles of abrasive material is introduced into the separation column, one or more neutralizing agents can be added to the aqueous slurry to neutralize the pH of the aqueous slurry. In one presently preferred embodiment, the aqueous slurry is initially subjected to a pH shock treatment, with stirring and cooling of the aqueous slurry, combined with electrical polarization of the aqueous slurry. In this embodiment, a shock tank is provided for acidifying the aqueous slurry to a pH of about 2 to 4, and for applying an electrical potential to the aqueous slurry in the shock tank. The aqueous slurry in the shock tank is also preferably cooled to a temperature between about 0° C. and about 15° C. In this embodiment, a neutralization tank is also provided for receiving the acidified aqueous slurry for neutralizing the aqueous slurry to a pH of preferably about 6.5–7.5. The resultant effluent is substantially neutral in pH, and can be used as gray water or irrigation, process cooling water, as make-up water for a reverse osmosis system, or can be safely disposed of in the industrial waste stream, as desired. Means are also preferably provided for drawing the slurry into the second tank by vacuum, and means are preferably provided for cooling the aqueous slurry to a temperature between about 0° C. and about 15° C. In a presently preferred embodiment, a filter is also provided for filtering the aqueous slurry to remove relatively larger particles, and the filter is currently preferably a reversible filter. By virtue of the non-impact nature of vacuum motivation and gravity, agglomeration and flocculation of particles for separation and collection are enhanced and improved in the method and system of the invention.

In another presently preferred embodiment, the aqueous slurry can be introduced into the cooling portion of the process chamber in a tangential direction relative to the longitudinal axis of the process chamber so as to cause the aqueous slurry to flow in a helical flow pattern. In one currently preferred embodiment, the aqueous slurry is introduced into the separation column at ambient temperature and pressure, and the supernatant liquid is subjected to a reduction of pressure in a vacuum chamber to cause bubbles entrapped in the supernatant liquid to rise to the surface of the supernatant liquid. In a currently preferred alternate embodiment, gas can be injected into the supernatant liquid in the vacuum chamber to enhance the bubbling of gas through the supernatant liquid. In either case, the bubbling of gas to the surface of the supernatant liquid forces some of the particles remaining in the supernatant liquid into sufficiently close proximity that the particles will further agglomerate due to van der Waals attraction. The agglomerated particles have a higher specific gravity than the water in the supernatant liquid, causing them to separate and precipitate to the bottom of the vacuum chamber, where they can be discharged with a portion of the supernatant liquid containing the agglomerations of the particles from the vacuum chamber to a collection tank. The remainder of the supernatant liquid can be discharged from the vacuum chamber to a supernatant liquid collection tank.

In a currently preferred embodiment, a centrifugal separator is used to continuously separate heavier particulates and agglomerated particles from supernatant fluid in order to provide improved performance of the process. Such a centrifugal separator is described in a co-pending application entitled "Apparatus For Continuous Separation Of Fine Solid Particles From A Liquid By Centrifugal Force."

The method and apparatus of the invention allow for removal of solids from a slurry waste stream on a continuous basis at flow rates to support the high volume of waste produced in the semiconductor manufacturing industry and the demands of fine grinding operations. The method and apparatus of the invention also provide for separation of slurry components from the semiconductor manufacturing process so that harmful byproducts can be separated and removed.

These and other aspects and advantages of the invention will become apparent from the following detailed description and the accompanying drawings, which illustrate by way of example the features of the invention.

BRIEF DESCRIPTION OF THE DRAWINGS

FIGS. 1-1 to 1-3 are a schematic diagram of the method and apparatus of a first embodiment of the invention for recovering water and slurry abrasives that have been used for chemical and mechanical planarization of semiconductor wafers;

FIGS. 3-1 to 3-3 are a schematic diagram of the method and apparatus of a second embodiment of the invention for recovering water and slurry abrasives that have been used for chemical and mechanical planarization of semiconductor wafers;

DETAILED DESCRIPTION OF THE PREFERRED EMBODIMENTS

As the density of electrical components and wiring in semiconductor devices have increased, such devices have become increasingly susceptible to failure due to surface irregularities on semiconductor wafers. Conventional methods utilized in the industry for chemical and mechanical planarization of the surface of semiconductor wafers to address this problem commonly result in a wasteful disposal of the abrasive agents and water in the slurry used for polishing the various layers of the semiconductor wafers.

Figure 11:
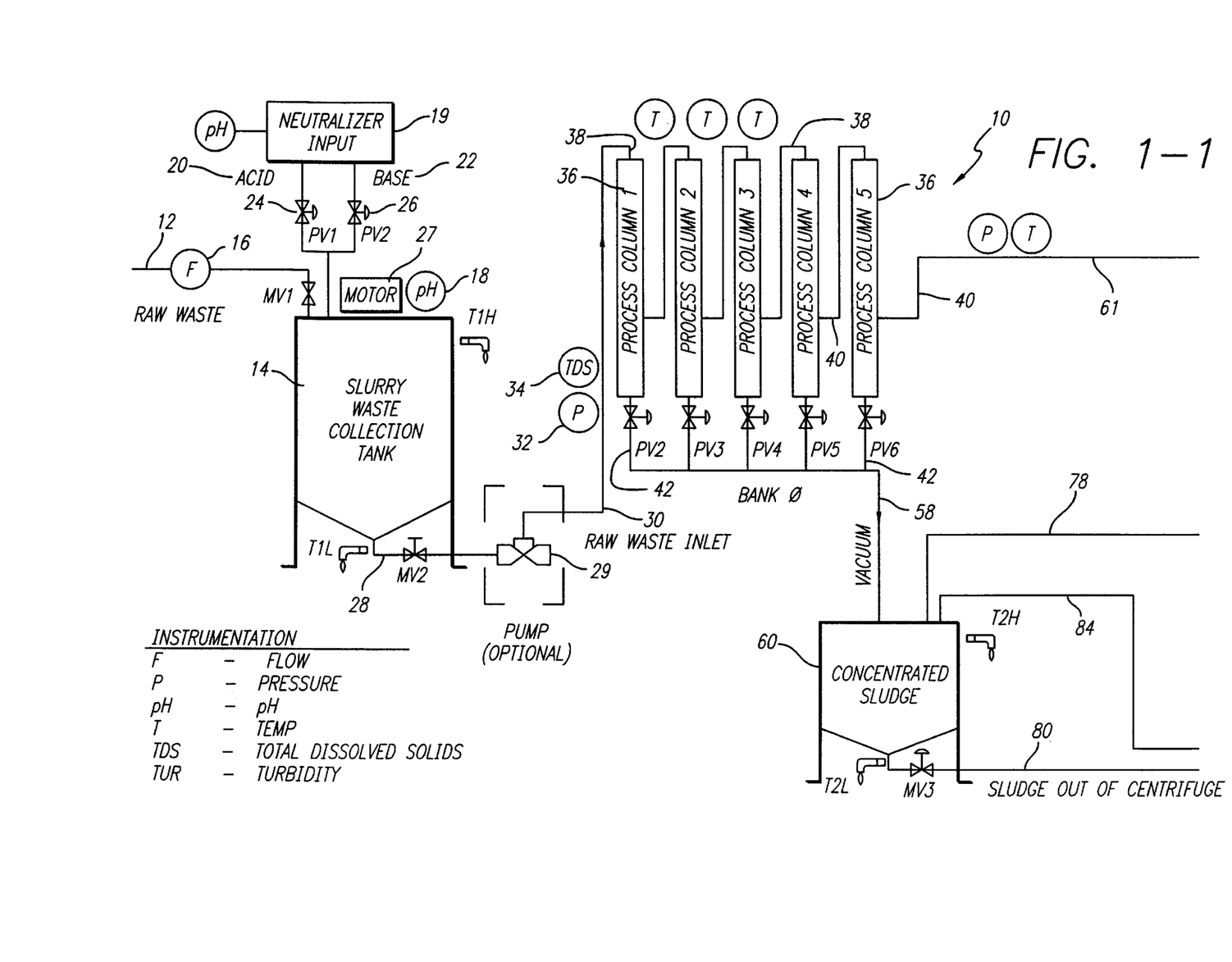
Figure 12:
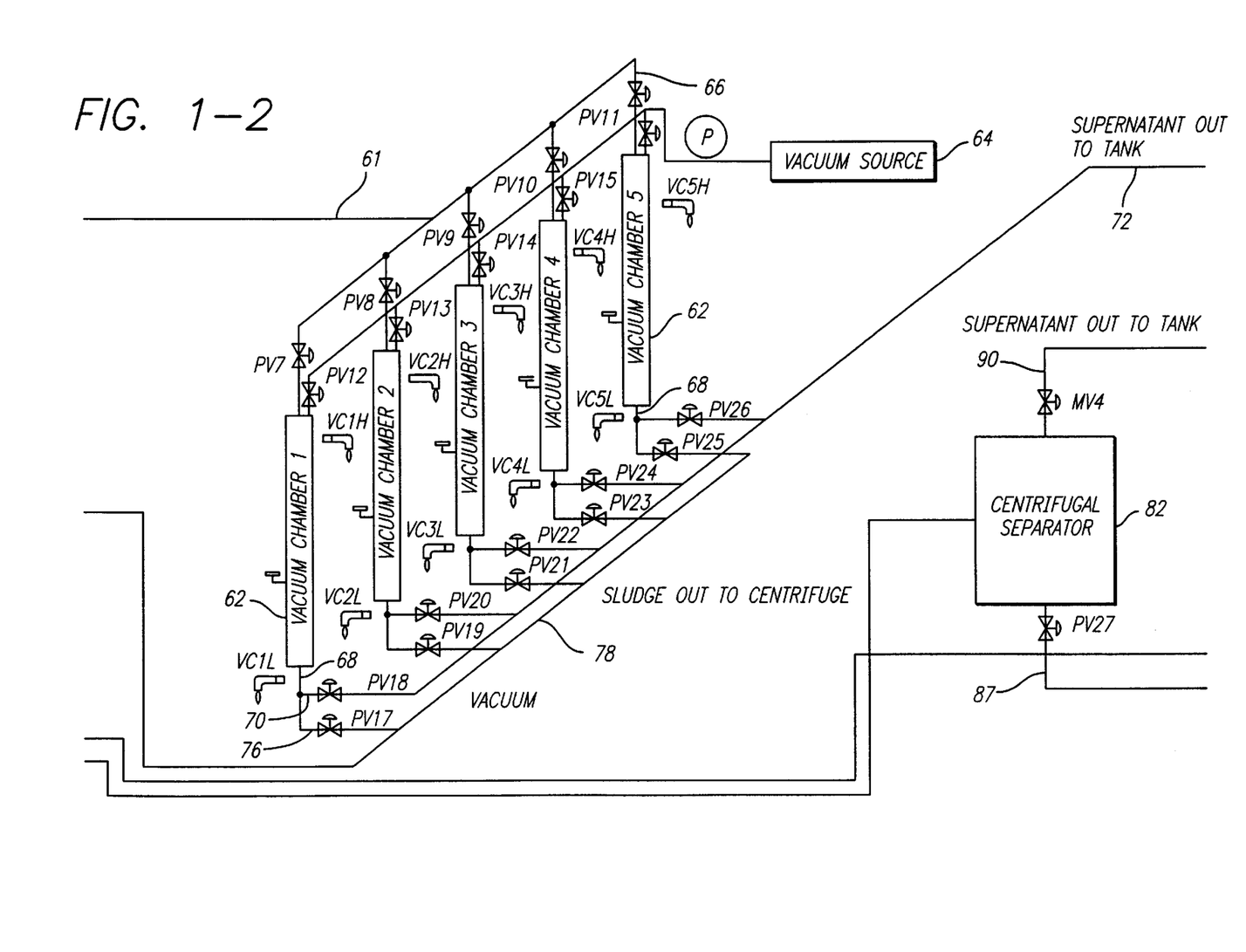
Figure 13:
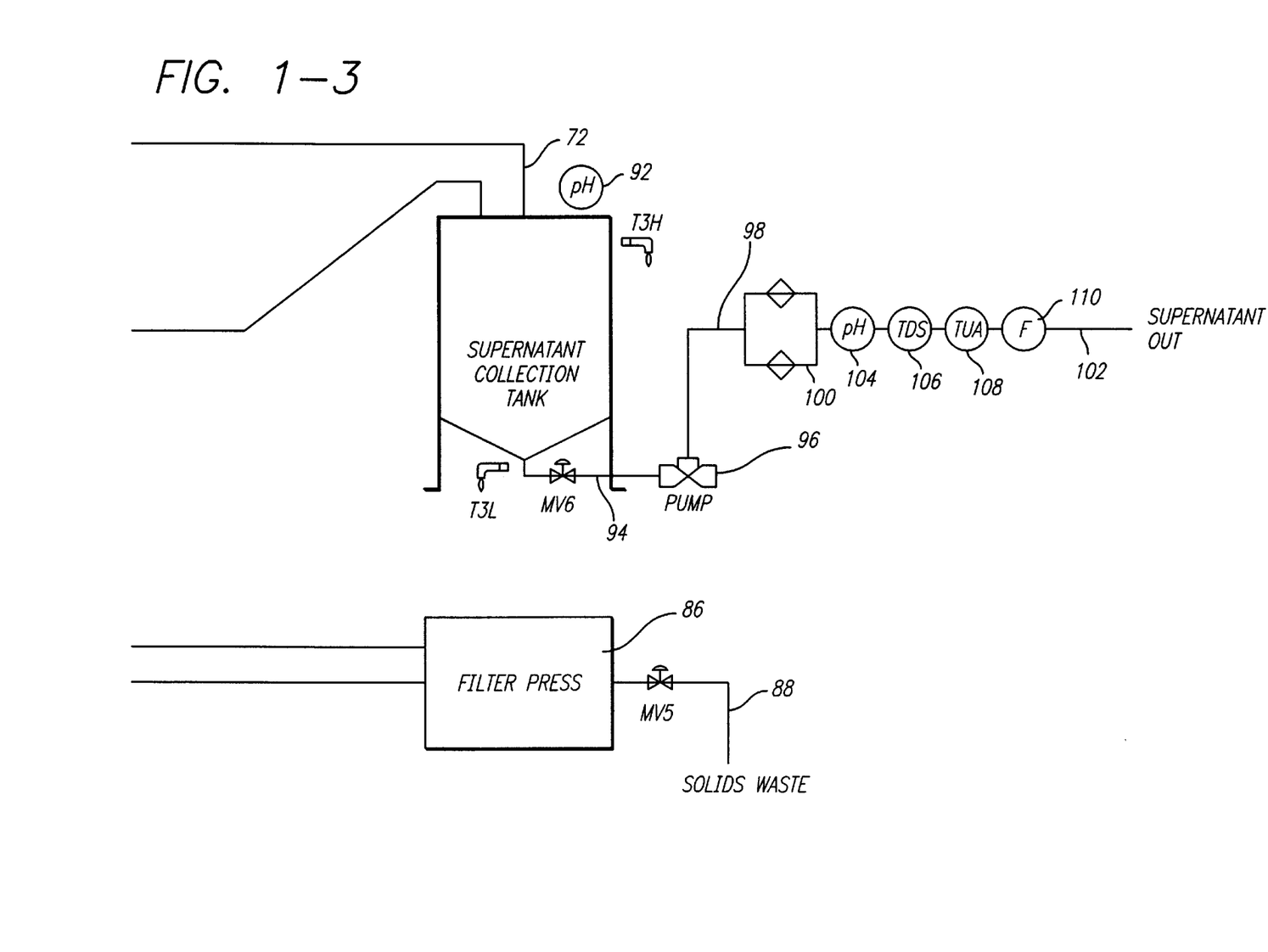

As is illustrated in the drawings, the invention is accordingly embodied in a method and apparatus for recovering particles of abrasive material from an aqueous slurry of the particles of abrasive material. Referring to FIG. 1, in a first presently preferred embodiment, an apparatus 10 for recovering particles of abrasive material from an aqueous slurry of the particles of abrasive material typically receives raw waste from inlet line 12 including the aqueous chemical and mechanical slurry containing abrasive particles and materials removed from planarization of semiconductor materials in a slurry waste collection tank 14. The quantity of flow of the slurry waste can be measured by a flow meter 16 connected to the raw waste inlet line. The slurry waste in the slurry waste collection tank is preferably maintained under conditions of ambient temperature and pressure, and is preferably maintained at approximately a neutral pH. The acidity or basicity of the slurry waste is preferably monitored by a pH meter 18 connected to the slurry waste collection tank.

Electrical signals indicative of the pH of the slurry waste in the collection tank can be received by a controller 19 for controlling the introduction into the slurry waste collection tank of pH neutralizing agents that are selected depending upon the pH of the slurry effluent. Neutralizing agents can include, for example, an acid from an acid reservoir 20 dispensed through acid valve 24 controlled by the controller, or a base from a base reservoir 22 through base valve 26 controlled by the controller, or pH buffer agents, all of which are well known to those skilled in the art. The slurry waste in the collection tank is typically stirred by a stirrer (not shown) in the collection tank that is driven by motor 27. The mixture of slurry effluent and any neutralizing agents can be held in the slurry collection tank for a period of time for treatment as desired, and then discharged for further processing through the collection tank outlet 28. Alternatively, the treated slurry effluent can be discharged continuously through the collection tank outlet 28.

Flow of the treated slurry effluent from the collection tank can be facilitated by pump 29 connected between the collection tank outlet and the treated slurry effluent line 30 leading to further processing of the slurry effluent. A pressure meter 32 and total dissolved solids meter 34 can be connected to the treated slurry effluent line for monitoring the condition of the treated slurry effluent.

The treated slurry effluent carried by the effluent line is preferably drawn by vacuum into one or more process chambers or separation columns 36 for separating the treated, slurry effluent into a portion containing a greater proportion of the abrasive particles, and a supernatant portion containing a lesser proportion of the abrasive particles. Alternatively, the slurry effluent can be pumped by positive pressure through the separation columns. Each separation column has an inlet 38 for receiving treated slurry effluent, a supernatant outlet line 40 for the lighter supernatant portion of the slurry effluent, and a bottom solids outlet 42 for the heavier portion of the separated slurry effluent containing a greater proportion of the abrasive particles. As is illustrated in FIG. 1, in a presently preferred embodiment, a plurality of the separation columns can be connected in series, so that the most upstream separation column receives treated slurry effluent from the slurry effluent collection tank, and subsequent downstream separation columns receive the lighter supernatant portion of the slurry effluent from an upstream separation column. The most downstream separation column supernatant outlet carries the processed supernatant for further processing.

Figure 2:
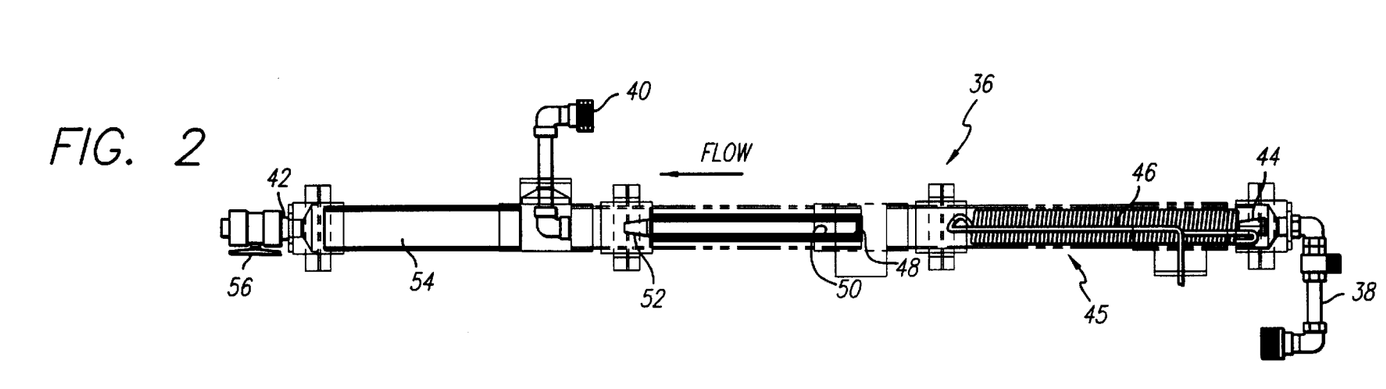
FIG. 2 is a sectional view of a separation column of FIG. 1.

With reference to FIG. 2, each separation column preferably has a nozzle 44 for introducing the treated slurry effluent into a cooling portion 45 of the separation column, surrounded by a cooling coil 46 carrying a flow of coolant. The nozzle preferably introduces the slurry effluent into the cooling portion of the separation column in a direction tangential to the longitudinal axis of the separation column to create a helical or circular flow of the slurry effluent in the cooling portion of the separation column. The cooling coil preferably cools the slurry effluent to a temperature between about 0° C. and about 15° C., facilitating agglomeration of the particles.

After the slurry effluent is cooled, it passes through precision machined openings between two charged electrode plates. Passage of the cooled slurry effluent between the negatively charged electrode 48 and the positively charged electrode 50 results in a change in the electrical properties of the particles, causing them to agglomerate, causing the resultant flocs of particles to separate from a supernatant liquid portion of the slurry effluent. The slurry effluent then passes through a second nozzle 52 that introduces the slurry effluent in a direction tangential to the longitudinal axis of the separation column to create a helical or circular flow of the slurry effluent, causing a portion of the aqueous slurry containing the agglomerations or flocs of the particles to move to the solids settling chamber 54 of the of the separation column, while the supernatant liquid remaining in the aqueous slurry exits through the supernatant outlet 40.

A solids outlet valve 56 allows control of the flow from the bottom solids outlet 42, so that the portion of the aqueous slurry in the solids settling chamber containing agglomerations of the particles can be discharged as desired from the solids settling chamber through a solids outlet line 58 to a solids collection tank 60, either periodically or continuously. In a presently preferred embodiment, a plurality of separating columns are connected in series such that the supernatant liquid from a supernatant outlet of one separating column passes to the inlet of the next separating column in sequence, while the supernatant outlet of the last separating column in the sequence carries the supernatant liquid for further processing and collection.

In one currently preferred embodiment, the supernatant liquid from the separating columns passes via supernatant line 61 to one or more vacuum chambers 62 connected to a source of vacuum 64. The temperature and pressure of the supernatant liquid in the supernatant line can be monitored by temperature and pressure sensors, if desired. In one currently preferred embodiment, the aqueous slurry is introduced into the process chamber at ambient temperature and pressure. In a presently preferred embodiment, the supernatant liquid line from the separating columns is connected to the inlet 66 to a plurality of vacuum chambers, each of which has a supernatant outlet 68 to supernatant outlet line 70, leading to inlet 72 to supernatant liquid collection tank 74. When the supernatant liquid in a vacuum chamber is subjected to a reduction of pressure, gas entrapped in the supernatant liquid bubbles to the surface of the supernatant liquid. The bubbling of gas to the surface of the supernatant liquid is believed to bring particles in the supernatant liquid into close proximity to cause further agglomeration of the particles due to van der Waals attraction among the particles. The agglomerated particles have a higher specific gravity than the water in the supernatant liquid, causing them to separate and precipitate to the bottom of the vacuum chamber. Alternatively, gas, such as clean dry air, oxygen or nitrogen, for example, can be injected in small quantities into the supernatant liquid in the vacuum chamber to further enhance the bubbling of gas through the supernatant liquid.

A solids outlet line 76 leading from the bottom of each vacuum chamber is connected to a solids line 78 leading to solids collection tank. In a presently preferred embodiment, an outlet line 80 from solids collection tank is connected to carry collected solids and liquid to a centrifugal separator 82. Liquid passes from the centrifugal separator to the supernatant collection tank 74. Liquid from the solids collection tank 60 pass through the fluid line 84 to filter press 86, which also receives concentrated solids from the centrifugal separator via solids outlet line 87 from centrifugal separator. Solids can ultimately be collected via solids waste line 88 from filter press 86. Supernatant liquid from the centrifugal separator flows via supernatant liquid outlet line 90 to the supernatant liquid collection tank 74. The pH of the supernatant liquid can be monitored by pH meter 92 connected to the supernatant liquid collection tank. The supernatant liquid can be collected through outlet 94, and can be pumped by a pump 96 through line 98 to one or more holding tanks 100 having supernatant outlets 102, where the quantity and quality of the supernatant liquid can be monitored, for example, by pH meter 104, total dissolved solids meter 106, turbidity meter 108, and flow meter 110.

Referring to FIGS. 3 to 7, in a currently preferred second embodiment of the invention, an apparatus 210 for recovering particles of abrasive material from an aqueous slurry of the particles of abrasive material typically receives raw waste from inlet line 212 including the aqueous chemical and mechanical slurry containing abrasive particles and materials removed from planarization of semiconductor materials in a slurry waste pH shock tank 214. The quantity of flow of the slurry waste can be measured by a flow meter 216 connected to the raw waste inlet line. The slurry waste in the slurry waste pH shock tank is preferably maintained under conditions of ambient temperature and pressure, and is preferably maintained at approximately a pH of about 2 to 4. The pH of the slurry waste is preferably monitored by a pH meter 218 connected to the slurry waste Ph shock tank, as is shown in FIG. 3.

Figure 4:
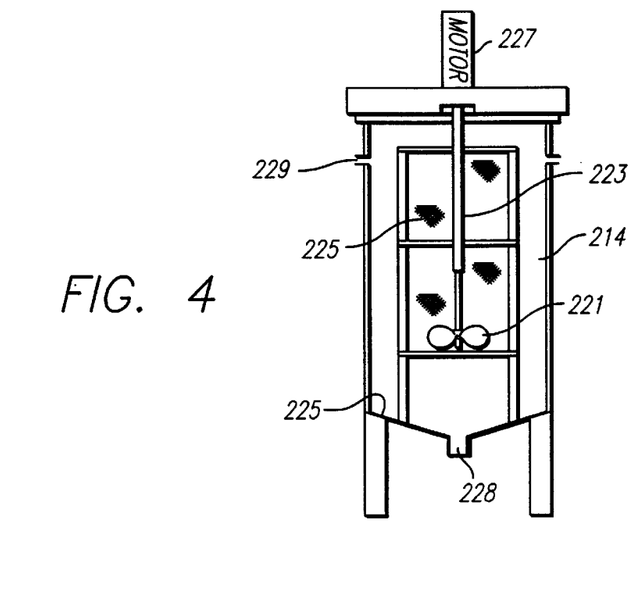
FIG. 4 is a sectional view of the shock tank of FIG. 3.

Referring to FIGS. 3 and 4, electrical signals indicative of the pH of the slurry waste in the pH shock tank can be received by a controller 219 for controlling the introduction into the slurry waste pH shock tank of an acid, such as HCl, for example, and other pH controlling agents, in quantities depending upon the pH of the slurry effluent. The acid is dispensed from an acid reservoir 220 through acid valve 224 controlled by the controller, or a base from a base reservoir 222 through base valve 226 controlled by the controller, or pH buffer agents. The slurry waste in the pH shock tank is typically stirred by a stirrer 221 in the pH shock tank that is driven by motor 227. The mixture of slurry effluent and any neutralizing agents can be held in the slurry pH shock tank for a period of time for treatment as desired, and is typically held in the shock tank for a period of time ranging up to about 1 hour. The acidified aqueous slurry is then discharged for further processing through the pH shock tank outlet 228 to the pH balance tank 214'.

As is illustrated in FIG. 4, the slurry waste pH shock tank 214 has a stirrer 221 propeller at end of a stirrer shaft 223 which also serves as a cathode for applying an electrical potential through the acidified aqueous slurry to change the electrical properties of the particles to facilitate agglomeration and flocculation of the particles. A wire mesh anode grid 225 is disposed in the shock tank around the stirrer shaft cathode, and is electrically connected with the base of the shock tank, which also serves as an anode. The voltage that is applied to the aqueous slurry in the shock tank is typically about 12 to 5,500 volts, although higher voltages may be even more effective. The shock tank also has a supernatant overflow outlet 229 for relief of excess aqueous slurry in the shock tank. A cooling jacket (not shown) typically of coils similar to those for the cooled process chamber preferably is used around the pH shock tank to cool the temperature of the aqueous slurry to a range of between about 0° C. and about 15° C. Electrophoresis is accomplished in the pH shock tank radially, driving the particles through the separation anode grid. Outside the stirring zone within the mesh grid, the particles agglomerate and fall to the bottom of the tank, and are drawn to the bottom of the tank by the anode plate at the bottom of the tank. The agglomeration process is enhanced by chilling the aqueous slurry to a temperature between about 0° C. and about 15° C., which decrease the effects of Joule heating and convective mixing caused by the electrophoretic process. Supernatant liquid can also be drawn off from the top of the pH shock tank to be neutralized and recycled with supernatant from other parts of the process.

Figure 31:
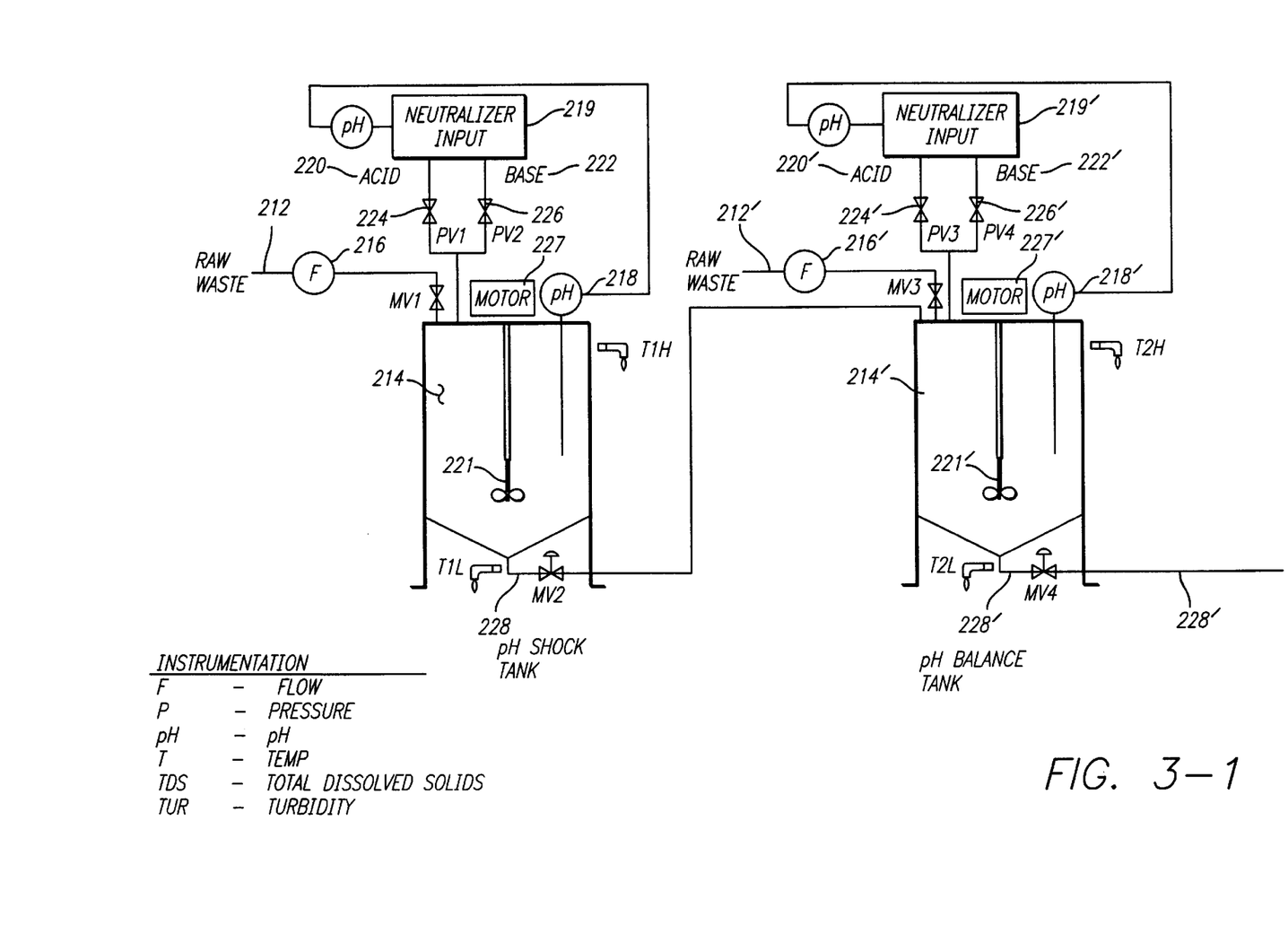
Figure 32:
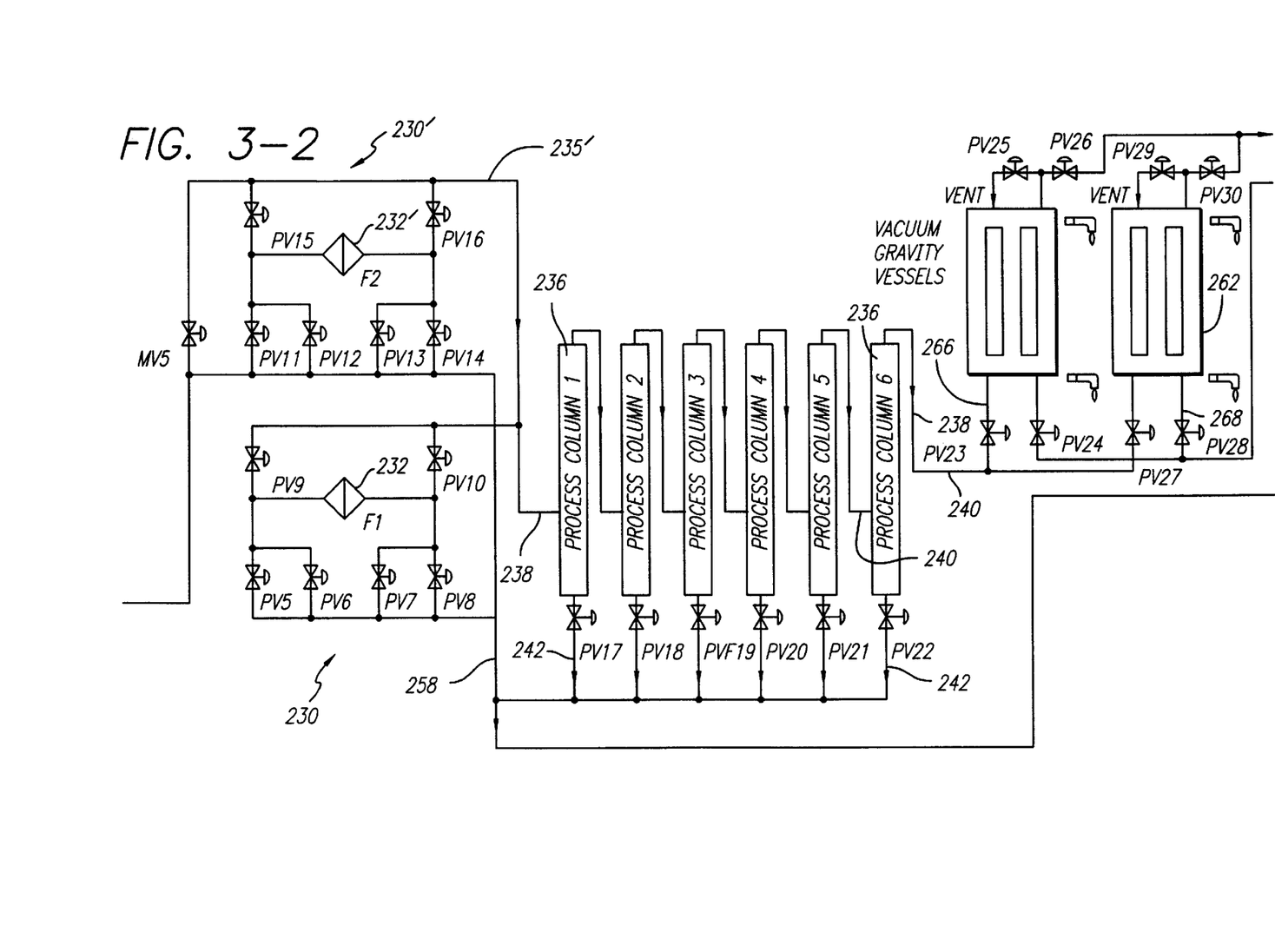
Figure 33:
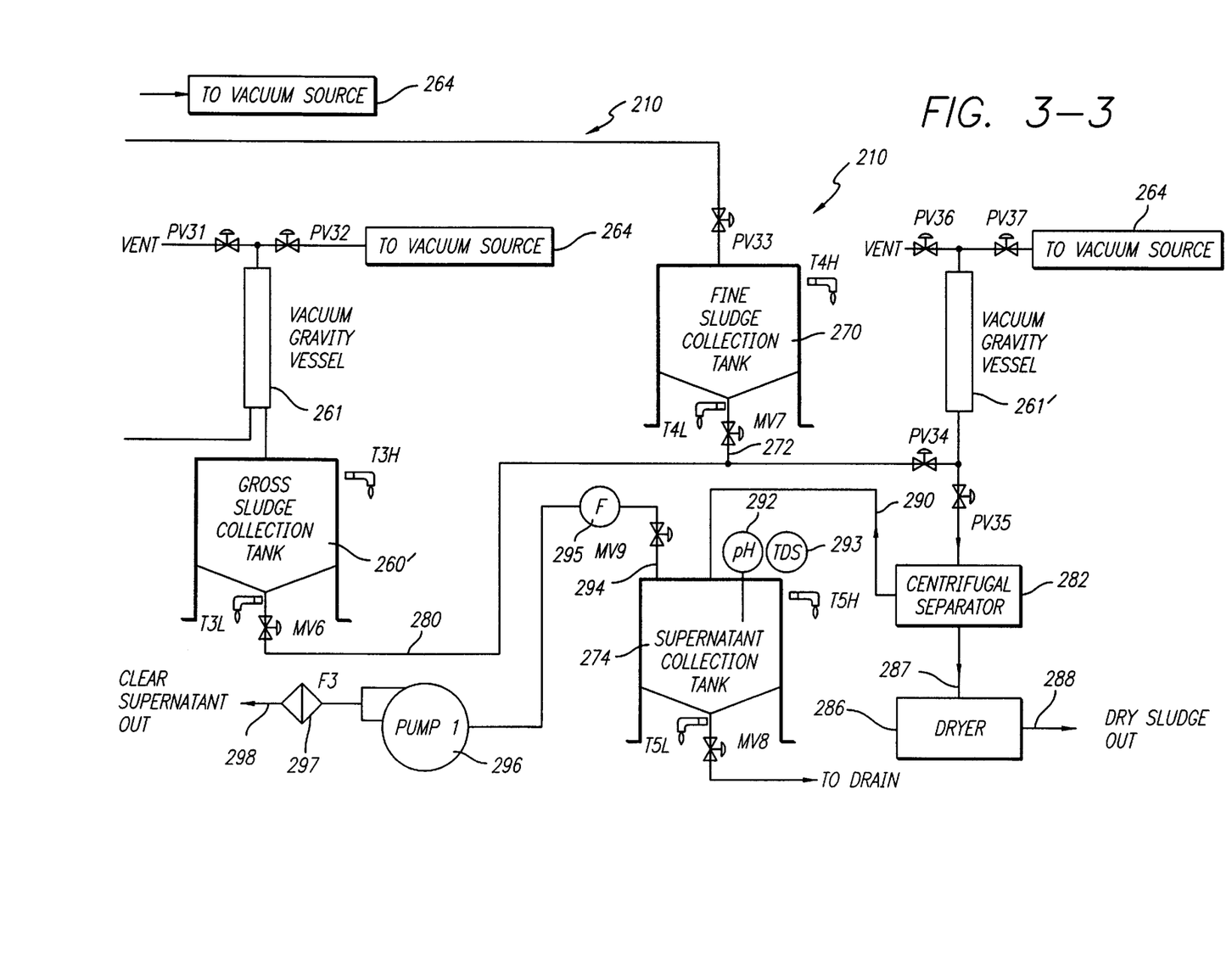

Referring to FIG. 3, the acidified solids/fluid solution is drawn off from the bottom of the pH shock tank under vacuum to the pH balance tank 214', and is mixed with untreated waste slurry received via inlet line 212', and neutralizing agents added to the pH balance tank. Electrical signals indicative of the pH of the slurry waste in the pH balance tank can be received by a controller 219' for controlling the introduction into the slurry waste pH balance tank of pH neutralizing agents that are selected depending upqn the pH of the slurry effluent. Neutralizing agents can include, for example, an acid such as HCl, for example, from an acid reservoir 220' dispensed through acid valve 224' controlled by the controller, or a base, such as sodium bicarbonate ($Na_2CO_3$), from a base reservoir 222' through base valve 226' controlled by the controller, or pH buffer agents, all of which are well known to those skilled in the art. The slurry waste in the pH balance tank is typically stirred by a stirrer 221' in the pH balance tank that is driven by motor 227'. The mixture of slurry effluent and any neutralizing agents can be held in the slurry pH balance tank for a period of time for treatment as desired, and then discharged for further processing through the pH balance tank outlet 228'. Alternatively, the treated slurry effluent can be discharged continuously through the pH balance tank outlet 228'. A cooling jacket (not shown) typically of coils similar to those for the cooled process chamber and the pH shock tank preferably is used around the pH balance tank to maintain the temperature of the pH neutralized aqueous slurry within a range of about 0° C. to about 15° C. for increasing the rate of agglomeration. Outside the agitation zone of the stirrer, agglomerated particles fall to the bottom of the pH balance tank.

Figure 5:
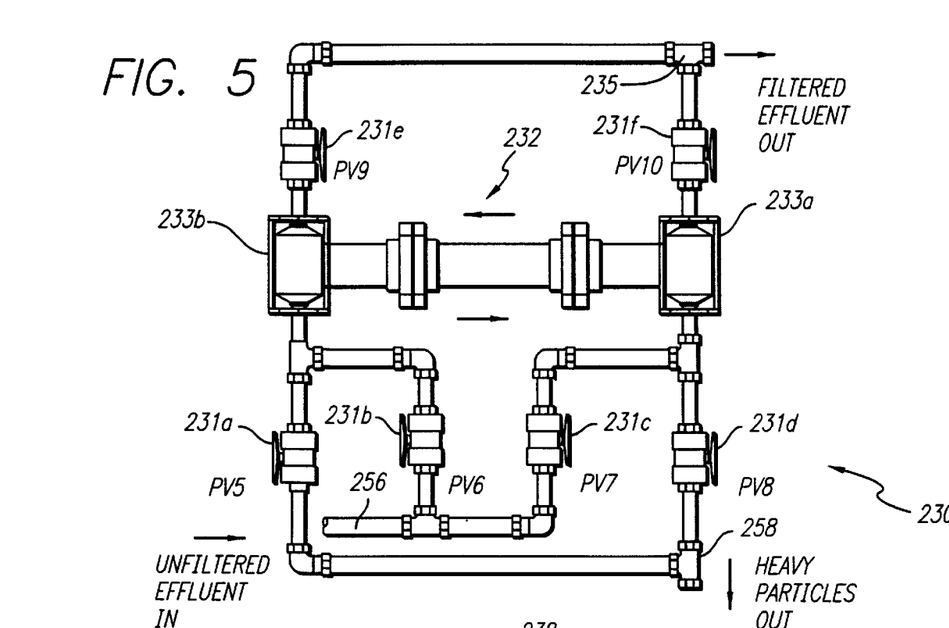
FIG. 5 is a schematic view of the filter assembly of FIG. 3.

The effluent from the pH balance tank then preferably is preferably drawn under vacuum to a first self-cleaning reversible gross particle filter assembly 230 and then to a second self-cleaning reversible filter assembly 230' which is substantially identical to the filter assembly 230, as is illustrated in FIGS. 3 and 5. The filter assemblies 230 and 230' will be described in detail with reference to the filter assembly 230 shown in FIG. 5. The self-cleaning gross particle filters operate by forcing a fluid flow through the filter containing a multi-layered filter material that traps gross particles. After a timed interval, the flow can be reversed through the filter, causing the gross particles previously captured in the filter media to flow out and to drop into a collection chamber. By repeating this process, the filters collect gross particles, and reduce the need for frequent filter replacement.

Figure 6:
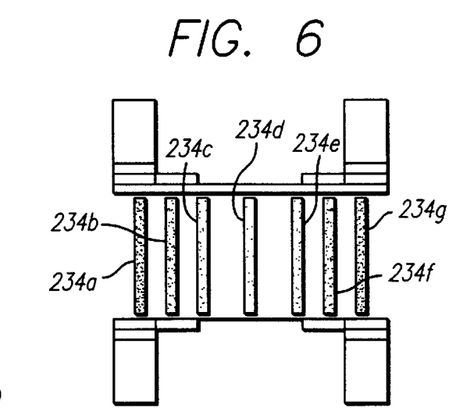
FIG. 6 is a sectional view of the filter of the filter assembly of FIG. 5.

The effluent from the pH balance tank outlet 228' is thus connected to filter assembly inlet 256 of the filter assembly, which includes a series of flow control valves 231a–231f connected to the inlet 256 that can be opened and closed to direct the flow of pH neutralized slurry through the filter 232 connected between the two filter manifolds 233a,b. As is shown in FIG. 6, in a currently preferred embodiment, the filter contains a sequence of symmetrically arranged layers of filter media 234a–g, with the gradation of the filter media being from coarsest to finest from the outside layers to the inside layer. Thus, the filter contains two outside gross filter media 234a,g respectively adjacent to a medium filter media 234b,f, followed respectively by an adjacent medium/fine filter media 234c,e, on either side of the innermost fine filter media 234d. Other similar arrangements of filter media may also be suitable. Thus, in operation, the filter assembly can be operated in either of two configurations allowing the direction of flow through the filter to be reversed periodically to flush gross particles from the filter, allowing the gross particles to be discharged through the filter assembly solids outlet 258. In an exemplary first configuration, valves 231a, b, d, f are closed and valves 231c and e are open, allowing flow from right to left through the filter. Filtered supernatant flows up through the supernatant liquid outlet 235. After a period of time for collecting gross particles on the right side of the filter, the valve configuration can be changed to a reversed flushing configuration in which valves 231a, c and e are closed, and valve 231d is temporarily opened and valve 231f temporarily closed to allow gross particles to be flushed to the right through to the solids outlet 258. Thereafter, valve 231d can be closed, and valve 231f opened, to allow flow in a normal second flow configuration from left to right through the filter and up through the supernatant liquid outlet 235. After a period of time for collecting gross particles on the left side of the. filter, the valve configuration can be again changed back to the original flow configuration for flushing of the filter, in which valves 231 b, d, f are closed, valve 231c is open, allowing flow from right to left through the filter, and valve 231a is temporarily opened and valve 231e temporarily closed to allow gross particles to be flushed to the left through to the solids outlet 258. Thereafter, valves 231a, b, d, f are closed and valves 231c and e are open, in the normal first flow configuration, allowing flow from right to left through the filter, and filtered supernatant flows out through the supernatant liquid outlet 235.

The treated slurry effluent carried by the effluent line is preferably drawn by vacuum through an inlet 238 into one or more process chambers or separation columns 236 for separating the treated slurry effluent into a portion containing a greater proportion of the abrasive particles, and a supernatant portion containing a lesser proportion of the abrasive particles. As is illustrated in FIG. 3, in a presently preferred embodiment, a plurality of the separation columns can be connected in series, so that the most upstream separation column receives treated slurry effluent from the slurry effluent collection tank, and subsequent downstream separation columns receive the lighter supernatant portion of the slurry effluent from an upstream separation column. The most downstream separation column supernatant outlet carries the processed supernatant for further processing and collection. Each separation column has an inlet 238 for receiving treated slurry effluent, a supernatant outlet line 240 for the lighter supernatant portion of the slurry effluent, and a bottom solids outlet 242 for the heavier portion of the separated slurry effluent containing a greater proportion of the abrasive particles.

Figure 7:
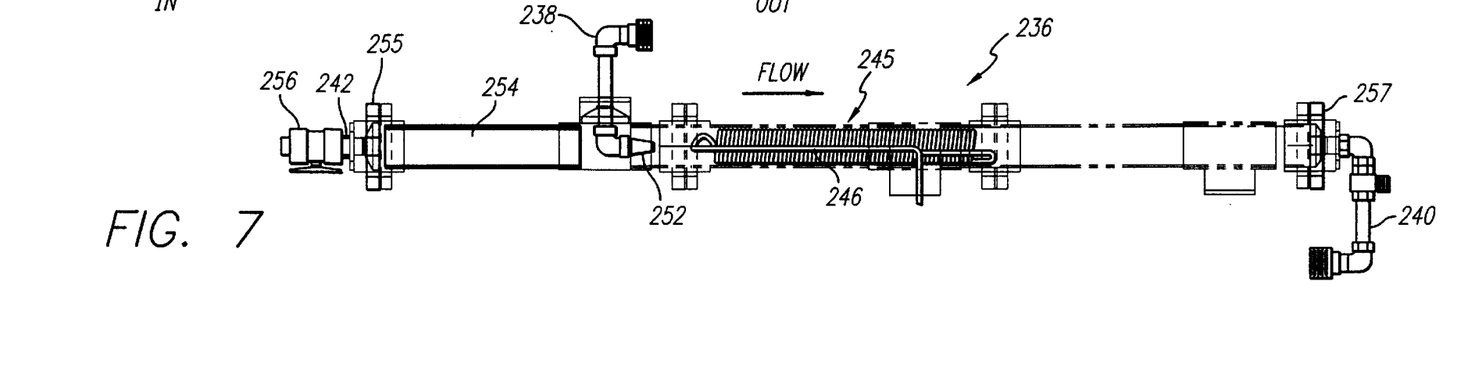
FIG. 7 is a sectional view of a separation column of FIG. 3.

With reference to FIG. 7, each separation column typically has a solids outlet end cap 255 and a supernatant liquid outlet end cap 257. for introducing the treated slurry effluent into a cooling portion 45 of the separation column, surrounded by a cooling coil 46 carrying a flow of coolant. A nozzle 252 receiving the aqueous slurry flow from the inlet preferably introduces the slurry effluent into the cooling portion of the separation column in a direction tangential to the longitudinal axis of the separation column to create a helical or circular flow of the slurry effluent in the cooling portion of the separation column. The cooling coil preferably cools the slurry effluent to a temperature between about 0° C. and about 15° C., facilitating agglomeration of the particles, causing a portion of the aqueous slurry containing the agglomerations or flocs of the particles to fall out of suspension to the solids settling chamber 254 at the bottom of the separation column, while the supernatant liquid remaining in the aqueous slurry exits through the supernatant outlet 240. The accumulated solids can be either periodically purged or continuously drawn by vacuum from the separation columns to a gross solids collection tank 260.

Referring to FIGS. 3 and 7, a solids outlet valve 256 allows control of the flow from the bottom solids outlet 242, so that the portion of the aqueous slurry in the solids settling chamber containing agglomerations of the particles can be discharged as desired from the solids settling chamber through a solids outlet line 258 to a gross solids collection tank 260, either periodically or continuously. In a currently preferred embodiment, the effluent from solids outline 258 is drawn to the gross solids collection tank by a vacuum gravity vessel 261 connected to a vacuum source 264. The gross solids collection tank can be emptied while fluid flow continues through the separating columns.

In a currently preferred embodiment, the supernatant liquid from the separating columns passes via supernatant outlet line 240 to one or more vacuum gravity vessel 262 connected to the source of vacuum 264. In one currently preferred embodiment, the aqueous slurry is introduced into the process chamber at ambient temperature and pressure. In a presently preferred embodiment, the supernatant liquid line from the separating columns is connected to the inlet 266 to a plurality of vacuum gravity vessels, each of which has a supernatant outlet 268 connected to the fine sludge collection tank 270, having an outlet 272.

An outlet line 280 from solids collection tank is connected to carry collected solids from the outlet of the gross solids collection tank and fine sludge from the fine sludge collection tank outlet and liquid remaining in the gross sludge and fine sludge to a centrifugal separator 282. The lighter liquid fraction separated in the centrifugal separator is conducted to the supernatant collection tank 274. Concentrated solids are conducted to a dryer 286 via the solids outlet line 287 from the centrifugal separator. Solids can ultimately be collected via solids waste line 288 from the dryer. Supernatant liquid from the centrifugal separator flows via supernatant liquid outlet line 290 to the supernatant liquid collection tank 274. The supernatant is drawn from the centrifuge, through an optional UV light source and ion exchange resin bead to remove dissolved solids, into the supernatant liquid collection tank for final processing. The pH and total dissolved solids of the supernatant liquid can be monitored by pH meter 292 and total dissolved solids metering station 293, respectively, connected to the supernatant liquid collection tank. The supernatant liquid can be collected through outlet 294, and can be pumped by a pump 296 through line 298, which can be provided with one or more filters 297.

In the case of silica-based and TEOS based slurries, the flocculated material may be recovered for reuse of the silicon or TEOS in the slurries. In the case of alumina-based slurries, the flocculated material may also be recovered for reuse of the silicon in the slurries. Due to metallic impurities, it is unlikely that alumina-based slurries can be reclaimed for use in the semiconductor industry. In the case where TEOS or silica-based and alumina or cesium-based slurries are combined, then the flocculated material is treated as alumina-based solids for reuse or disposal. The reuse or disposal of the silicon, alumina and other metals and the required purity for any such reuse is well known to those skilled in the art of slurry manufacture.

It will be apparent from the foregoing that while particular forms of the invention have been illustrated and described, various modifications can be made without departing from the spirit and scope of the invention. Accordingly, it is not intended that the invention be limited, except as by the appended claims.

What is claimed is:

1. A method for separating particles of material suspended in an aqueous slurry, the steps of the method comprising:

cooling the aqueous slurry containing particles of material to a temperature between about 0° C. and about 15° C. to cause said particles to agglomerate; and allowing the agglomerated particles of material to precipitate from the aqueous slurry leaving a supernatant liquid portion of said aqueous slurry, thereby separating the particles of material from the aqueous slurry.

2. The method of claim 1, further comprising the step of applying an electrical potential to said aqueous slurry to enhance the agglomeration of the particles of material.

3. The method of claim 1, further comprising the steps of subjecting said supernatant liquid portion of said aqueous slurry to a reduction of ambient pressure of said liquid to cause gas entrapped in said supernatant liquid to bubble to the surface of said supernatant liquid.

4. The method of claim 1, further comprising the step of adding a neutralizing agent to said aqueous slurry prior to said step of cooling, to neutralize the pH of said aqueous slurry.

5. The method of claim 1, wherein said step of cooling said aqueous slurry comprises introducing said aqueous slurry in a tangential direction into a process chamber so as to cause sad aqueous slurry to flow in a heical flow pattern through said process chamber.

6. The method of claim 5, wherein said aqueous slurry is introduced into said process chamber at ambient temperature and pressure, and further comprising the steps of passing said supernatant liquid to a vacuum chamber and connecting said vacuum chamber in fluid communication with a source of vacuum to cause gas entrapped in said supernatant liquid to bubble to the surface of said supernatant liquid.

7. The method of claim 6, wherein said step of passing said supernatant liquid to a vacuum chamber further comprises injecting gas into said supernatant liquid.

8. The method of claim 1, further comprising the steps of:

acidifying said aqueous slurry prior to said step of cooling said aqueous slurry; and neutralizing the pH of said aqueous slurry.

9. The method of claim 8, wherein said step of acidifying said aqueous slurry comprises acidifying said aqueous slurry to a pH in the range of about 2 to 4.

10. The method of claim 8, wherein said step of acidifying said aqueous slurry comprises applying an electrical potential to said aqueous slurry between a first electrode and a second electrode to cause electrophoretic separation of said particles of material.

11. The method of claim 10, wherein said step of applying an electrical potential comprises applying a voltage of about 12 to 5,500 volts to said aqueous slurry.

12. The method of claim 8, wherein said step of acidifying said aqueous slurry comprises stirring said aqueous slurry for a period of time ranging up to about an hour.

13. The method of claim 8, wherein said step of acidifying said aqueous slurry comprises cooling said aqueous slurry to a temperature between about 0° C. and about 15° C.

14. The method of claim 8, wherein said step of neutraizing said aqueous slurry comprises drawing said slurry into a tank by vacuum.

15. The method of claim 8, wherein said step of neutralizing said aqueous slurry comprises neutralizing said aqueous slurry to a pH of about 6.5–7.5.

16. The method of claim 8, wherein said step of neutraizing said aqueous slurry comprises cooling said aqueous slurry to a temperature between about 0° C. and about 15° C.

17. The method of claim 8, further comprising the step of filtering said aqueous slurry to remove relatively larger particles following said step of neutralizing said aqueous slurry.

* * * * *